(12) United States Patent
Miyata

(10) Patent No.: US 7,163,456 B2
(45) Date of Patent: Jan. 16, 2007

(54) VEHICLE AIR CONDITIONER

(75) Inventor: Manabu Miyata, Oobu (JP)

(73) Assignee: Denso Corporation, Kariya (JP)

( * ) Notice: Subject to any disclaimer, the term of this patent is extended or adjusted under 35 U.S.C. 154(b) by 251 days.

(21) Appl. No.: 10/822,350

(22) Filed: Apr. 9, 2004

(65) Prior Publication Data

US 2004/0200612 A1 Oct. 14, 2004

(30) Foreign Application Priority Data

Apr. 10, 2003 (JP) ............................ 2003-106738

(51) Int. Cl.
*B60S 1/58* (2006.01)
(52) U.S. Cl. .................... 454/121; 237/12.3 B; 165/41
(58) Field of Classification Search ........... 237/12.3 B, 237/12.3 R, 12.3 C, 12.3 A; 454/121; 165/41, 165/42

See application file for complete search history.

(56) References Cited

U.S. PATENT DOCUMENTS

| | | | | |
|---|---|---|---|---|
| 3,854,525 A | * | 12/1974 | Illg ............................ | 165/42 |
| 4,174,001 A | * | 11/1979 | Ellis ............................ | 171/17 |
| 4,456,423 A | * | 6/1984 | Mittmann .................. | 415/55.2 |
| 4,531,671 A | * | 7/1985 | Schwenk ................ | 237/12.3 B |
| 4,758,119 A | * | 7/1988 | Frase et al. ................. | 406/109 |
| 4,882,826 A | * | 11/1989 | Belanger et al. ............ | 29/527.1 |
| RE33,334 E | * | 9/1990 | Nelson ......................... | 15/302 |
| 5,064,315 A | * | 11/1991 | Samejima et al. .......... | 406/100 |
| 5,924,766 A | * | 7/1999 | Esaki et al. ............ | 297/180.13 |
| 5,964,658 A | * | 10/1999 | Aizawa ....................... | 454/156 |
| 6,045,444 A | * | 4/2000 | Zima et al. .................. | 454/121 |
| 6,471,137 B1 | * | 10/2002 | Moore .................... | 237/12.3 B |
| 6,478,369 B1 | * | 11/2002 | Aoki et al. ............ | 297/180.13 |
| 6,675,589 B1 | * | 1/2004 | Howard ......................... | 62/63 |

FOREIGN PATENT DOCUMENTS

| | | |
|---|---|---|
| JP | 7-92079 | 10/1995 |
| JP | 2002-161896 | 6/2002 |

* cited by examiner

*Primary Examiner*—Derek S. Boles
(74) *Attorney, Agent, or Firm*—Harness, Dickey & Pierce, PLC

(57) ABSTRACT

Engine cooling water is charged to a flexible diaphragm member (3d) to expand the flexible diaphragm member (3d) so that the substantial sectional area of an air passage (3b) is decreased when a ventilation resistance, in an air conditioning casing (2) in a maximum heating or a foot mode, is increased. On the other hand, the engine cooling water is discharged from the flexible diaphragm member (3d) to deflate the flexible diaphragm member (3d) so that the substantial sectional area of the air passage (3b) is increased when a ventilation resistance, in the air conditioning casing (2) in maximum cooling or face mode, is decreased. Thus, the property of a fan (3) can be changed into a property suitable for foot mode having a large ventilation resistance, while heating air is being supplied.

8 Claims, 3 Drawing Sheets

IN MAXIMUM HEATING

IN USUAL HEATING

VEHICLE AIR CONDITIONER

BACKGROUND OF THE INVENTION

1. Field of the Invention

The present invention relates to an air conditioner for a vehicle.

2. Description of the Related Art

An air conditioner for a vehicle has characteristics in which a ventilation resistance in an air conditioning casing connected to a fan (air blowing unit) varies in accordance with operation states such as a blowing mode and an air conditioning preset temperature.

Concretely, in a comparison between face mode in which air is mainly blown to the upper body of a passenger and foot mode in which air is mainly blown to the lower body of a passenger, the ventilation resistance of the face mode is usually smaller than that of the foot mode.

In an automatically controlled air conditioner for a vehicle, the blowing mode is determined based on the air conditioning preset temperature or the like. Therefore, the blowing mode varies as the air conditioning preset temperature varies and, then, the ventilation resistance varies.

As shown in FIG. 4, the fan is actuated at an intersection between a graph showing air blowing property of a fan and a graph showing a ventilation resistance, and the noise of the fan is minimized at a point of actuation at which the maximum efficiency can be obtained.

The maximum air volume is needed in a rapid cooling operation, in which an air conditioning load is maximized, in summer. Therefore, in a usual air conditioner for a vehicle, the air blowing property of the fan is optimized in accordance with a ventilation resistance in face mode which is heavily used for cooling in summer and, thus, the noise and energy consumption of the fan can be reduced.

Therefore, in foot mode whose ventilation resistance is largely different from that of face mode, the fan has to be operated at a point of actuation deviated from the point of actuation in which the maximum efficiency can be obtained and, thus, the noise is increased and air blowing efficiency is reduced.

In a heating operation, the blowing mode is usually switched to foot mode, and a heated air is blown to a vehicle compartment. However, when a heating load is large in winter, air having a low temperature has to be drawn and heated and, thus, it is difficult to increase the temperature of the air, blown to a vehicle compartment, to a predetermined temperature in a short time.

SUMMARY OF THE INVENTION

In view of the above drawbacks, the object of the present invention is, first, to provide a new vehicle air conditioner different from a conventional one and, second, to increase, in a short time, the temperature of air blown to a vehicle compartment to a temperature sufficient to heat the compartment, while reducing the noise, even in, for example, foot mode having a large ventilation resistance in, for example, a vehicle air conditioner provided with a fan optimized for the face mode having a small ventilation resistance.

In order to accomplish the above object, according to a first aspect of the present invention, there is provided an air conditioner for a vehicle, comprising a fan (3); an air conditioning casing (2) that is provided at the downstream side of the fan (3) in an air flow direction and that defines an air passage through which air is blown from the fan (3) to a vehicle compartment; heating means (5) that is housed in the air conditioning casing (2) and that heats the air supplied to a vehicle compartment; and a flexible diaphragm member (3d) to/from which a fluid is charged/discharged to vary the sectional area of the air passage (3b), said flexible diaphragm member being disposed in the air passage (3b) in the fan (3), wherein the fluid is charged or discharged in accordance with a ventilation resistance in the air conditioning casing (2).

Thus, because the property of the fan (3) can be changed in accordance with a ventilation resistance, it is possible to improve an air blowing efficiency while reducing the noise even in a blowing mode having a large ventilation resistance, in the fan (3) optimized in a blowing mode having a small ventilation resistance.

According to a second aspect of the present invention, there is provided an air conditioner for a vehicle, comprising a fan (3); an air conditioning casing (2) that is provided at the downstream side of the fan (3) in an air flow direction and that defines an air passage through which air is blown from the fan (3) to the a vehicle compartment; heating means (5) that is housed in the air conditioning casing (2) and that heats the air blown to a vehicle compartment; and a flexible diaphragm member (3d) to/from which a fluid is charged/discharged to vary the sectional area of the air passage (3b), said flexible diaphragm member being disposed in the air passage (3b) in the fan (3), wherein a heated medium is charged to the flexible diaphragm member (3d) in maximum heating.

Thus, the property of the fan (3) is changed into a property suitable for a high pressure loss. Therefore, it is possible to improve the blowing efficiency while reducing the noise even in maximum heating, in the fan (3) optimized in a blowing mode having a small ventilation resistance.

Because a heated fluid is charged to a flexible diaphragm member (3d) which is in contact with a blown air, the blown air can be heated by the fluid in the flexible diaphragm member (3d) and heating means (5) and, thus, the temperature of air blown to a vehicle compartment can be increased to a temperature sufficient to heat the compartment, in a short time.

As described above, in the present invention, not only in a face mode having a small ventilation resistance and in maximum cooling (rapid cooling), but also in a foot mode having a large ventilation resistance, and in maximum heating, an air blowing efficiency can be improved while reducing the noise, and the temperature of air blown to a vehicle compartment can be increased to a temperature sufficient to heat the compartment, in a short time.

Thus, the property of the fan (3) is changed into a property suitable for a high pressure loss. Therefore, it is possible to improve the air blowing efficiency while reducing the noise even in maximum heating, in the fan (3) optimized in a blowing mode having a small ventilation resistance.

Because a heated fluid is charged to a flexible diaphragm member (3d) which is in contact with a blown air, the blown air can be heated by the fluid in the flexible diaphragm member (3d) and heating means (5) and, thus, the temperature of air blown to a vehicle compartment can be increased to a temperature sufficient to heat the compartment, in a short time.

As described above, in the present invention, not only in a face mode having a small ventilation resistance and in maximum cooling (rapid cooling), but also in a foot mode having a large ventilation resistance and in maximum heating, an air blowing efficiency can be improved while reducing the noise, and the temperature of air blown to a vehicle compartment can be increased to a temperature sufficient to heat the compartment, in a short time.

According to a third aspect of the present invention, there is provided an air conditioner for a vehicle, wherein the heated medium is engine cooling water.

According to a fourth aspect of the present invention, there is provided an air conditioner for a vehicle, comprising a fan (3); an air conditioning casing (2) that is provided at the downstream side of the fan (3) in an air flow direction and that defines an air passage through which air is blown from the fan (3) to a vehicle compartment; heating means (5) that is housed in the air conditioning casing (2) and that heats the air supplied to a vehicle compartment; and a flexible diaphragm member (3d) to/from which a fluid is charged/discharged to vary the sectional area of the air passage (3b), said flexible diaphragm member being disposed in the air passage (3b) in the fan (3), wherein a heated medium is charged to the flexible diaphragm member (3d) in foot mode in which air is supplied toward the lower side of a vehicle compartment.

According to a fifth aspect of the present invention, there is provided an air conditioner for a vehicle, wherein the heated medium is engine cooling water.

According to a sixth aspect of the present invention, there is provided an air conditioner for a vehicle, wherein a number of recessed and projected portions are provided in the portion of the flexible diaphragm member (3d), which is exposed to air passing through the air passage (3b).

Thus, a contact area and a thermal conductivity between the flexible diaphragm member (3d) and the air can be increased, and a heat exchange effectiveness can be improved.

According to a seventh aspect of the present invention, there is provided an air conditioner for a vehicle, wherein the flexible diaphragm member (3d) is divided into a plurality of layered spaces, and the spaces to/from which a fluid is charged/discharged are switched in accordance with a ventilation resistance in the air conditioning casing (2).

According to an eighth aspect of the present invention, there is provided an air conditioner for a vehicle, wherein the fan (3) comprises a centrifugal fan (3a) that has a number of vanes, around a rotating shaft thereof, to supply, in radial directions, air drawn along an axial direction of the rotating shaft; and a scroll casing (3c) that houses the centrifugal fan (3a) and defines a spiral air passage (3b) through which air blown from the centrifugal fan (3a) passes, and the flexible diaphragm member is disposed at at least an inner wall of an outer periphery of the scroll casing (3c).

Incidentally, the reference numerals in parentheses, to denote the above means, are intended to show the relationship to the specific means which will be described later in an embodiment of the invention.

The present invention may be more fully understood from the description of preferred embodiments of the invention set forth below, together with the accompanying drawings.

DESCRIPTION OF THE PREFERRED EMBODIMENTS

Figure 1:
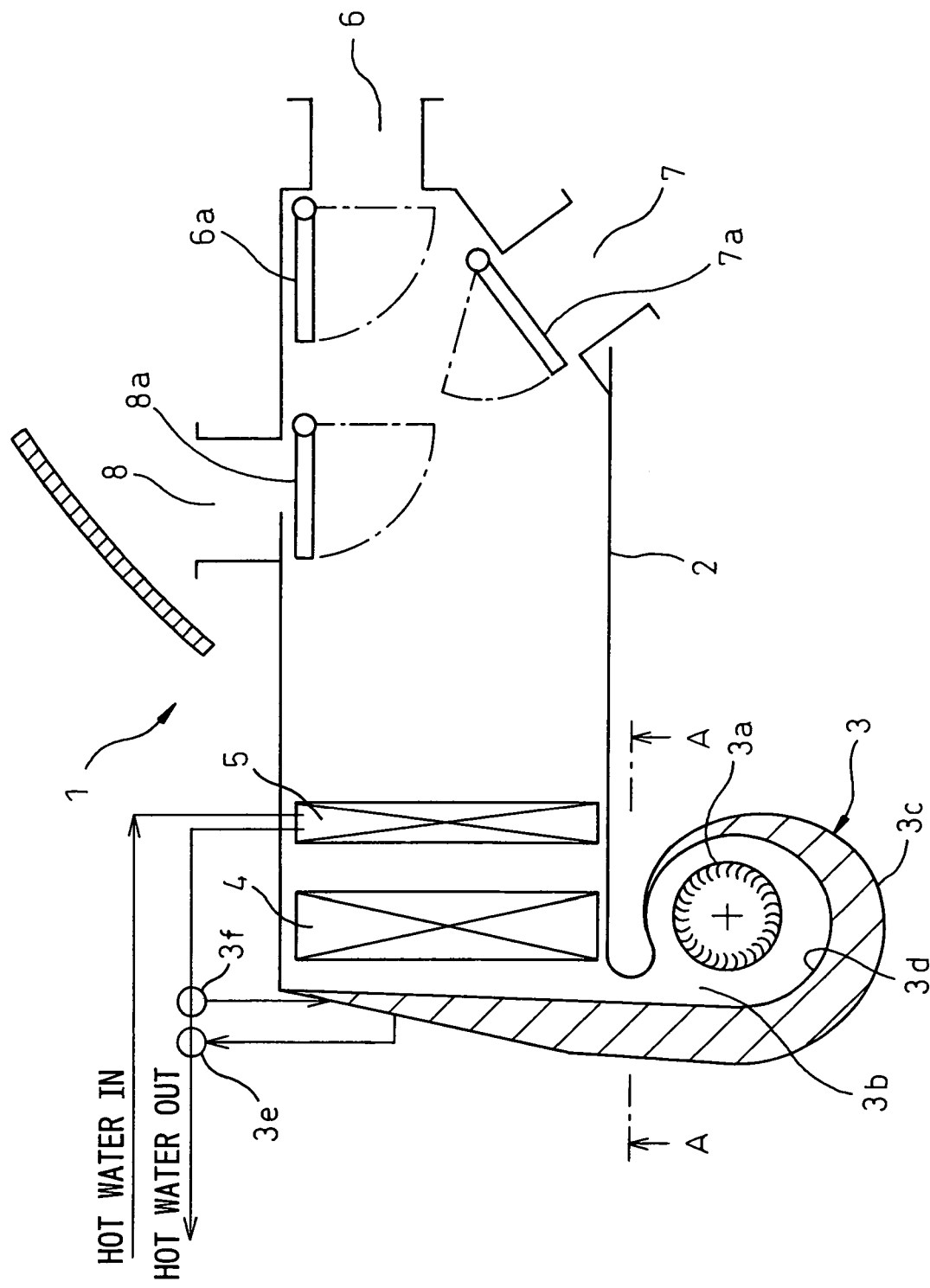
FIG. 1 is a schematic view of an embodiment of an air conditioner according to the present invention.

A first embodiment of the present invention will be described below. FIG. 1 is a schematic view (conceptual view) of a ventilation system of a vehicle air conditioner 1 according to the present embodiment. An inside air suction port (not shown) for drawing air from inside a vehicle and an outside air suction port (not shown) for drawing outside air, along with a suction port switching door for adjusting the amount of air introduced from these suction ports, are formed at the upstream side, in an air flow direction, in an air conditioning casing 2 which defines an air passage of air that flows into a vehicle compartment.

The suction port switching door is opened and closed by driving means such as a servomotor or the like, or by a manual operation.

A filter (not shown) for removing dust in the air and a fan (air blowing unit) 3 are disposed at the downstream side in an air flow direction, with respect to the suction port switching door. The air drawn from the both suction ports is sent toward each air outlet that will be described below. The fan (air blowing unit) will be described in detail below.

The air blowing side of the fan 3 is connected to, or is identical with, the air conditioning casing 2. An evaporator 4 as a cooler for cooling the air blown to a vehicle compartment is disposed at the upstream side in an air flow direction in the air conditioning casing 2, and the whole air sent by the fan 3 passes through the evaporator 4.

In the present embodiment, an evaporator of a vapor compression type refrigerator which carries out refrigeration by evaporating a coolant is adopted as a cooler. However, the present invention is not limited to this, and another cooler may be adopted.

A heater 5 for heating the air blown to the vehicle compartment is disposed at the downstream side in an air flow direction, with respect to the evaporator 4. The heater 5 according to the present embodiment, heats the air by using, as a source of heat, waste heat generated in a vehicle, such as cooling water for an engine for driving a vehicle.

In the present embodiment, the whole amount of air passing through the evaporator 4 passes through the heater 5, and a reheat system, in which the temperature of air blown to the vehicle compartment is adjusted by adjusting the amount of engine cooling water that circulates in the heater 5, is adopted.

A face air outlet 6 for blowing conditioned air to the upper body of a passenger in a vehicle, a foot air outlet 7 for blowing air to the lower body of a passenger in a vehicle and a defroster air outlet 8 for blowing air toward an inner surface of a window glass such as a front glass or the like, are formed at the most downstream part of the air conditioning casing 2.

Blowing mode switching doors 6a, 7a and 8a for switching and controlling the blowing mode are disposed at the upstream side in an air flow direction with respect to the above-described air outlets 6 to 8. The blowing mode switching doors 6a, 7a and 8a are opened and closed by driving means such as a servo motor or by manual operation.

In blowing modes, there are a face mode in which air is mainly blown from the face air outlet 6, a foot mode in which air is mainly blown from the foot air outlet 7, a bi-level mode in which air is blown from the face air outlet and the foot air outlet, and a defroster mode in which air is mainly blown from the defroster air outlet 8, etc.

In general, in a vehicle air conditioner, the area of an opening of the face air outlet 6 is larger than those of other air outlets. Accordingly, the resistance of ventilation (pressure loss) in the face mode in which air is blown from the face air outlet 6 is smaller than those of other blowing modes (foot mode and defroster mode).

Figure 2:
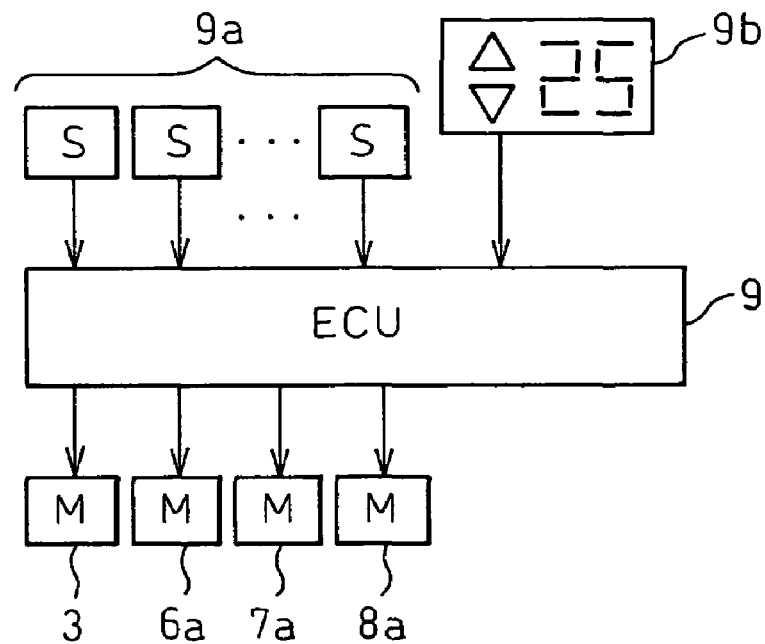
FIG. 2 is a schematic view of an embodiment of a control system of an air conditioner according to the present invention.

As shown in FIG. 2, in an electronic control unit (ECU) 9, detection signals from air conditioning sensors 9a such as an inside air sensor for detecting the temperature of air inside a vehicle, an outside air sensor for detecting the temperature of outside air, an after-evaporation sensor for detecting the temperature of air immediately after passing through the evaporator 4 and a solar radiation sensor for detecting the amount of solar radiation received inside a vehicle, and a desired compartment temperature that is determined and input by a passenger, i.e., an output of an operation panel 9b, are input.

The ECU 9 calculates a target temperature of air blown to the vehicle compartment, i.e., a target air temperature TAO in accordance with a program stored in advance and based on signals input to the ECU 9 and, then controls the suction port switching door, a flow rate control valve for adjusting the amount of the engine cooling water that circulates in the heater 5, blowing mode switching doors 6a, 7a and 8a, and the fan 3, based on the target air temperature TAO.

The fan 3 will be described below.

As shown in FIG. 1, the fan 3 according to the present embodiment is composed of a centrifugal fan 3a (see JIS B 0132 No. 1004) that has a number of vanes around a rotating shaft thereof to blow, in radial directions, air drawn along an axial direction of the rotating shaft; a scroll casing 3c that houses the centrifugal fan 3a and defines a spiral air passage 3b through which air blown from the centrifugal fan 3a; and a motor that rotates the centrifugal fan 3a.

The scroll casing 3c is formed so that the sectional area of the air passage 3b is gradually enlarged from a beginning of scroll to an end of scroll, in order to efficiently collect air blown from the centrifugal fan 3a and send the same to a downstream side. In the present embodiment, the radius of an inner wall of an outer periphery of the scroll casing 3c is gradually increased as represented by a logarithmic spiral function, with respect to a scroll angle measured at the beginning of scroll.

A flexible diaphragm member 3d, defines a sealed chamber to/from which fluid is charged/discharged to vary the sectional area of the air passage 3b, is provided in the air passage 3b. In the present embodiment, the engine cooling water supplied from the heater 5 is charged to the sealed chamber defined by the flexible diaphragm member 3d to expand the flexible diaphragm member 3d, and the engine cooling water in the sealed chamber defined by the flexible diaphragm member 3d is discharged toward an engine to deflate the flexible diaphragm member 3d.

A valve 3e is valve means to open and close the discharging portion of the flexible diaphragm member 3d, and a valve 3f is valve means to open and close the inflow portion of the flexible diaphragm member 3d.

The control and characteristics of the flexible diaphragm member 3d of the present embodiment will be described below.

Figure 3A:
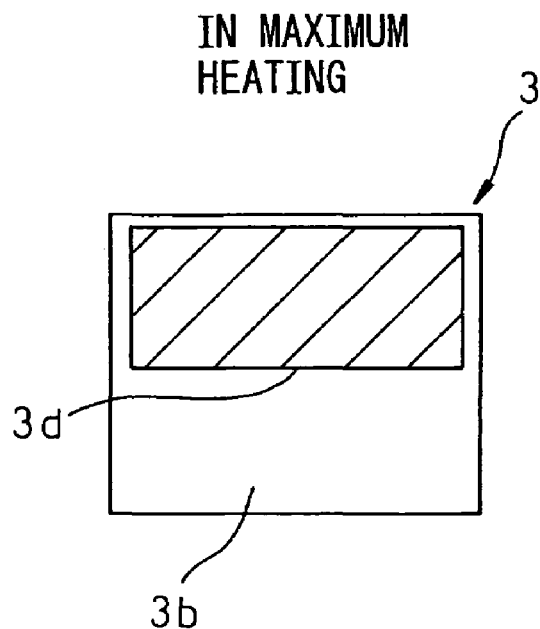
FIGS. 3A and 3B are sectional views taken along the line A—A in FIG. 1.
Figure 3B:
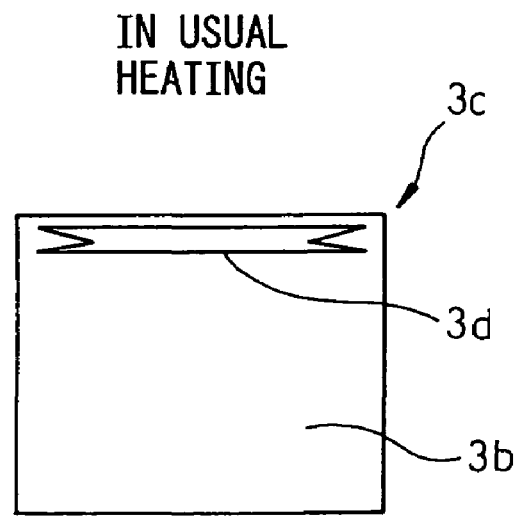

In the present embodiment, as shown in FIG. 3A, a heated medium, i.e., engine cooling water is charged to the flexible diaphragm member 3d to expand the flexible diaphragm member 3d so that the substantial sectional area of the air passage 3b is decreased when a ventilation resistance occurred in the air conditioning casing 2 in maximum heating or foot mode is increased. On the other hand, as shown in FIG. 3B, a fluid is discharged from the flexible diaphragm member 3d to deflate the flexible diaphragm member 3d so that the substantial sectional area of the air passage 3b is increased when a ventilation resistance occurred in the air conditioning casing 2 in maximum cooling or face mode is decreased.

Figure 4:
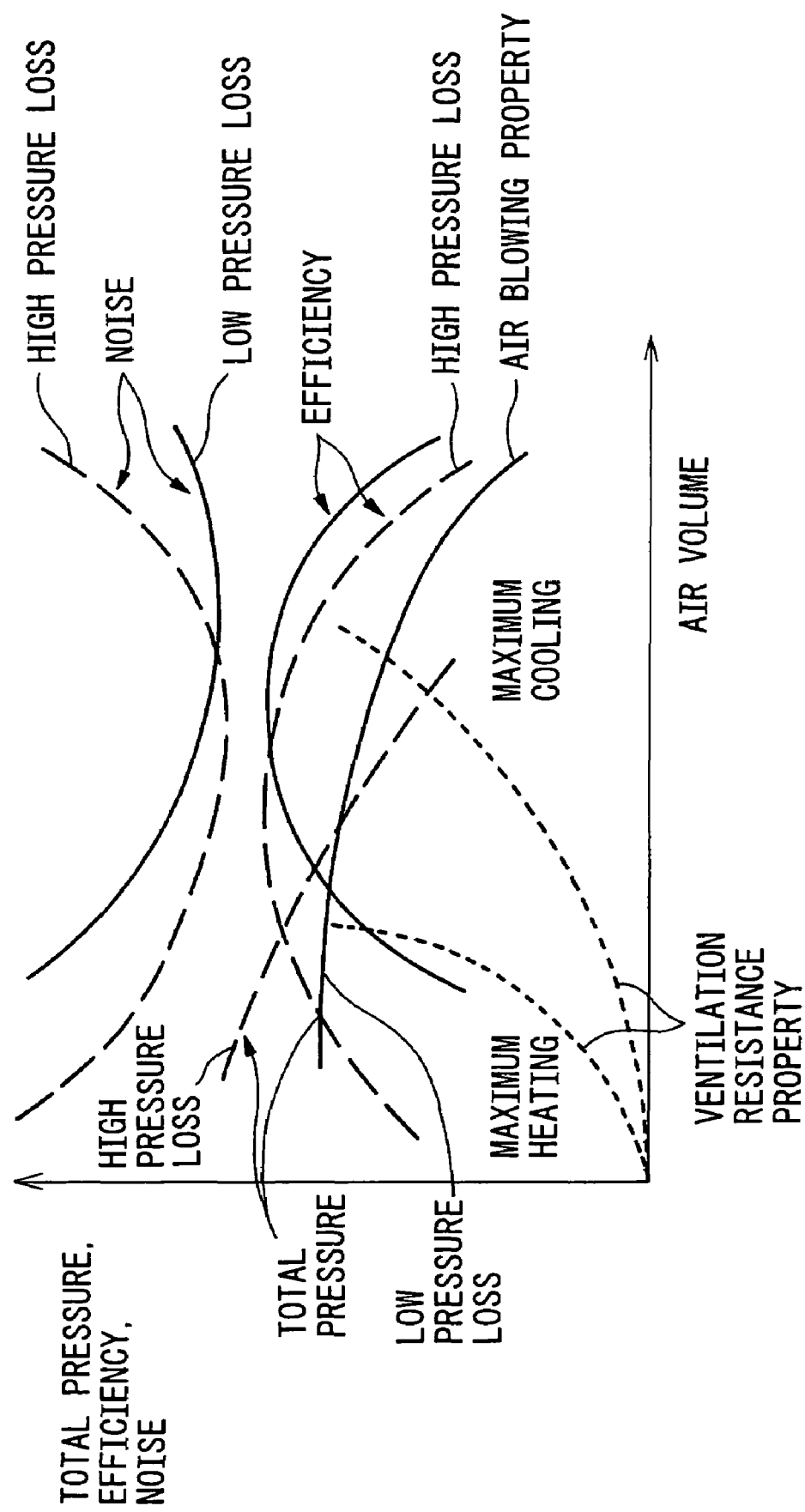
FIG. 4 is a graph showing a relation between air volume, noise and pressure.

Here, the fan 3, i.e., the scroll casing 3c is optimized in accordance with a ventilation resistance at the time of face mode that is heavily used at a cooling operation in summer. Therefore, if the flexible diaphragm member 3d is expanded so that the substantial sectional area of the air passage 3b is decreased when the ventilation resistance in the air conditioning casing 2 in maximum heating or foot mode is increased, the property of the fan 3 varies from a property optimized at a low pressure loss shown by a solid line in FIG. 4 to a property optimized at a high pressure loss shown by a phantom line in FIG. 4.

Therefore, even in the fan 3 optimized in face mode having a small ventilation resistance, the air blowing efficiency can be improved while reducing the noise even in foot mode having a large ventilation resistance.

Because a heated fluid is charged to flexible diaphragm member 3d that is in contact with a blown air, the blown air can be heated by the fluid in the flexible diaphragm member 3d and the heater 5. Thus, the temperature of air sent to a vehicle compartment can be increased to a temperature sufficient to heat the vehicle compartment in a short time.

As described above, in the present embodiment, not only in face mode or maximum cooling (rapid cooling) having a small ventilation resistance, but also in foot mode or maximum heating, the air blowing efficiency can be improved while reducing the noise, and the temperature of air blown to the vehicle compartment can be increased to a temperature sufficient to heat the vehicle compartment in a short time.

In an automatically controlled air conditioner for a vehicle, the blowing mode is automatically controlled based on the target air temperature TAO. Therefore, in the present embodiment, the blowing mode is detected based on the target air temperature TAO, however, it is needless to say that the blowing mode may be detected at the blowing mode switching doors 6a, 7a and 8a.

The flexible diaphragm member 3d is positioned at the upstream side of the heater 5 in a ventilation air flow direction, and the heater 5 is positioned at the upstream side of the flexible diaphragm member 3d in an engine cooling water flow direction. Therefore, a temperature difference between the engine cooling water and the ventilation air in the flexible diaphragm member 3d, and a temperature difference between the engine cooling water and the ventilation air in the heater 5, can be kept large and, thus, the ventilation air can be heated efficiently.

A second embodiment will be described below. In the second embodiment, a number of recessed and projected portions (dimples) are provided in the portion of the flexible diaphragm member 3d, which is exposed to the air passing through the air passage 3b, so that a contact area and a thermal conductivity between the flexible diaphragm member 3d and the air can be increased, and a heat exchanger effectiveness between the engine cooling water and the air can be improved.

A third embodiment will be described below. In the above embodiment, it is difficult to adjust an expanding amount of the flexible diaphragm member 3d. Therefore, in the third embodiment, the inside of the flexible diaphragm member 3d is divided into a plurality of layered spaces, and the spaces, to/from which a fluid is charged/discharged, are switched in accordance with a ventilation resistance in the air conditioning casing 2. Concretely, the sectional area of the air passage 3b is decreased as the ventilation resistance is increased, and the sectional area of the air passage 3b is increased as the ventilation resistance is decreased.

The ventilation resistance in the air conditioning casing 2 varies in accordance with the blowing mode and a ventilation amount. Therefore, in the present embodiment, the spaces, to/from which a fluid is charged/discharged, are switched based on at least one of blowing mode and a ventilation amount of the fan 3. However, the present embodiment is not limited to this. A ventilation amount in the air conditioning casing 2 may be directly detected by, for example, a pressure sensor or the like, and the spaces to/from which a fluid is charged/discharged, may be switched based on the detected value.

Finally, another embodiment will be described below. Because an automatically controlled air conditioner for a vehicle is adopted in the above embodiment, the blowing mode is automatically switched to the foot mode in maximum heating, and to the face mode in maximum cooling. Therefore, the sectional area of the air passage 3b varies in accordance with the blowing mode. However, the present invention is not limited to this. The sectional area of the air passage 3b may vary in accordance with an air conditioning load in maximum heating and maximum cooling.

A reheat-type air conditioner is adopted in the above embodiment. However, the present embodiment is not limited to this. An air mixing method, in which for example, a bypass passage for bypassing the heater 5 is provided to adjust a ratio between the amount of air passing through the heater 5 and the amount of air passing through the bypass passage, so that the temperature of the air blown to a vehicle compartment is adjusted, may be adopted.

In the above embodiment, the flexible diaphragm member 3d and the heater 5 are connected in series in an engine cooling water flow direction. However, the present invention is not limited to this. For example, the flexible diaphragm member 3d and the heater 5 may be connected in parallel in an engine cooling water flow direction.

In the fan (air blowing unit) 3 according to the above embodiment, the fan (air blowing unit) 3 includes a portion between the air blowing portion of the scroll casing 3c and the upstream side of the evaporator 4 in an air flow direction. However, the present invention is not limited to this.

In the automatically controlled air conditioner for a vehicle, the blowing mode is automatically controlled based on the target air temperature TAO. Therefore, charging of a fluid into the flexible diaphragm member 3d and discharging of a fluid from the flexible diaphragm member 3d may be controlled based on the target air temperature TAO.

The target air temperature TAO represents a control target temperature of air blown to a vehicle compartment, and is determined based on a compartment temperature set by a passenger and an inside air temperature, etc.

While the invention has been described by reference to specific embodiments chosen for purposes of illustration, it should be apparent that numerous modifications could be made thereto by those skilled in the art without departing from the basic concept and scope of the invention.

The invention claimed is:

1. An air conditioner for a vehicle, comprising
   a fan;
   an air conditioning casing that is provided at the downstream side of the fan in an air flow direction and that defines an air passage through which air is blown from the fan to a vehicle compartment;
   heating means that is housed in the air conditioning casing and that heats the air blown to a vehicle compartment; and
   a flexible diaphragm member defining a sealed chamber to/from which a fluid is charged/discharged to vary the sectional area of the air passage, said flexible diaphragm member being disposed in the air passage in the fan, wherein
   the fluid is charged or discharged in accordance with a ventilation resistance in the air conditioning casing.

2. An air conditioner for a vehicle, comprising:
   a fan;
   an air conditioning casing that is provided at the downstream side of the fan in an air flow direction and that defines an air passage through which air is blown from the fan to a vehicle compartment;
   heating means that is housed in the air conditioning casing and that heats the air blown to a vehicle compartment; and
   a flexible diaphragm member defining a sealed chamber to/from which a fluid is charged/discharged to vary the sectional area of the air passage, said flexible diaphragm member being disposed in the air passage in the fan; wherein
   a heated medium is charged to the flexible diaphragm member in maximum heating.

3. An air conditioner for a vehicle, comprising
   a fan;
   an air conditioning casing that is provided at the downstream side of the fan in an air flow direction and that defines an air passage through which air is blown from the fan to a vehicle compartment;
   heating means that is housed in the air conditioning casing and that heats the air blown to a vehicle compartment; and
   a flexible diaphragm member to/from which a fluid is charged/discharged to vary the sectional area of the air passage, said flexible diaphragm member being disposed in the air passage in the fan, wherein
   a heated medium is charged to the flexible diaphragm member in maximum heating; and
   the heated medium is engine cooling water.

4. An air conditioner for a vehicle, comprising
   a fan;
   an air conditioning casing that is provided at the downstream side of the fan in an air flow direction and that defines an air passage through which air is blown from the fan to a vehicle compartment;
   heating means that is housed in the air conditioning casing and that heats the air blown to a vehicle compartment; and
   a flexible diaphragm member defining a sealed chamber to/from which a fluid is charged/discharged to vary the sectional area of the air passage, said flexible diaphragm member being disposed in the air passage in the fan, wherein
   a heated medium is charged to the flexible diaphragm member in foot mode in which air is blown toward the lower side of a vehicle compartment.

5. An air conditioner for a vehicle, comprising
   a fan;
   an air conditioning casing that is provided at the downstream side of the fan in an air flow direction and that defines an air passage through which air is blown from the fan to a vehicle compartment;

heating means that is housed in the air conditioning casing and that heats the air blown to a vehicle compartment; and heating means that is housed in the air conditioning casing and that heats the air blown to a vehicle compartment; and a flexible diaphragm member to/from which a fluid is charged/discharged to vary the sectional area of the air passage, said flexible diaphragm member being disposed in the air passage in the fan, wherein a heated medium is charged to the flexible diaphragm member in foot mode in which air is blown toward the lower side of a vehicle compartment; and the heated medium is engine cooling water.

6. An air conditioner for a vehicle, comprising a fan;

an air conditioning casing that is provided at the downstream side of the fan in an air flow direction and that defines an air passage through which air is blown from the fan to a vehicle compartment;

heating means that is housed in the air conditioning casing and that heats the air blown to a vehicle compartment; and a flexible diaphragm member to/from which a fluid is charged/discharged to vary the sectional area of the air passage, said flexible diaphragm member being disposed in the air passage in the fan, wherein the fluid is charged or discharged in accordance with a ventilation resistance in the air conditioning casing; and a number of recessed and projected portions are provided in the portion of the flexible diaphragm member which is exposed to air passing through the air passage.

7. An air conditioner for a vehicle, comprising a fan;

an air conditioning casing that is provided at the downstream side of the fan in an air flow direction and that defines an air passage through which air is blown from the fan to a vehicle compartment;

heating means that is housed in the air conditioning casing and that heats the air blown to a vehicle compartment; and a flexible diaphragm member to/from which a fluid is charged/discharged to vary the sectional area of the air passage, said flexible diaphragm member being disposed in the air passage in the fan, wherein the fluid is charged or discharged in accordance with a ventilation resistance in the air conditioning casing; and the flexible diaphragm member is divided into a plurality of layered spaces, and the spaces to/from which a fluid is charged/discharged are switched in accordance with a ventilation resistance in the air conditioning casing.

8. An air conditioner for a vehicle, comprising a fan;

an air conditioning casing that is provided at the downstream side of the fan in an air flow direction and that defines an air passage through which air is blown from the fan to a vehicle compartment;

heating means that is housed in the air conditioning casing and that heats the air blown to a vehicle compartment; and a flexible diaphragm member to/from which a fluid is charged/discharged to vary the sectional area of the air passage, said flexible diaphragm member being disposed in the air passage in the fan, wherein the fluid is charged or discharged in accordance with a ventilation resistance in the air conditioning casing; and the fan comprises a centrifugal fan that has a number of vanes, around a rotating shaft thereof, to supply, in radial directions, air drawn along an axial direction of the rotating shaft; and a scroll casing that houses the centrifugal fan and defines a spiral air passage through which air supplied from the centrifugal fan passes, and the flexible diaphragm member is disposed at at least an inner wall of an outer periphery of the scroll casing.

* * * * *